United States Patent
Shelton et al.

(10) Patent No.: US 7,983,654 B2
(45) Date of Patent: Jul. 19, 2011

(54) PRIVATE NETWORK EMERGENCY ALERT PAGER SYSTEM

(75) Inventors: John Travis Shelton, Westfield, NC (US); Jordan J. Boyette, Westfield, NC (US); Gregory H. Williams, Kernersville, NC (US)

(73) Assignee: New Centurion Solutions, Inc., Kernersville, NC (US)

( * ) Notice: Subject to any disclaimer, the term of this patent is extended or adjusted under 35 U.S.C. 154(b) by 168 days.

(21) Appl. No.: 12/404,585

(22) Filed: Mar. 16, 2009

(65) Prior Publication Data

US 2009/0251312 A1  Oct. 8, 2009

Related U.S. Application Data

(60) Provisional application No. 61/036,623, filed on Mar. 14, 2008.

(51) Int. Cl.
 *H04M 11/04* (2006.01)
 *G08B 21/02* (2006.01)
 *G08B 23/00* (2006.01)

(52) U.S. Cl. ............. 455/404.2; 455/521; 455/457; 340/539.13; 340/539.15; 340/539.18; 340/573.4

(58) Field of Classification Search ........... 340/539.13–539.18, 825.49, 8.1, 340/286.01, 573.4; 455/404.1, 404.2, 521; 725/108
See application file for complete search history.

(56) References Cited

U.S. PATENT DOCUMENTS

| | | | |
|---|---|---|---|
| 5,594,945 A * | 1/1997 | Lewis et al. | 340/7.27 |
| 6,483,427 B1 * | 11/2002 | Werb | 340/10.1 |
| 6,731,214 B2 * | 5/2004 | Kuo | 340/573.1 |
| 6,774,795 B2 | 8/2004 | Eshelman et al. | |
| 6,882,837 B2 * | 4/2005 | Fernandez et al. | 455/404.1 |
| 7,084,740 B2 * | 8/2006 | Bridgelall | 340/10.42 |
| 7,123,126 B2 * | 10/2006 | Tanaka et al. | 340/5.2 |
| 7,146,190 B2 * | 12/2006 | Rosner | 455/557 |
| 7,245,216 B2 | 7/2007 | Burkley et al. | |
| 7,263,379 B1 * | 8/2007 | Parkulo et al. | 455/521 |
| 7,330,710 B1 * | 2/2008 | Xu et al. | 455/404.1 |
| 2004/0080421 A1 * | 4/2004 | Wunderlich | 340/573.4 |
| 2005/0035872 A1 * | 2/2005 | Nyfelt | 340/825.49 |
| 2006/0040639 A1 * | 2/2006 | Karl et al. | 455/404.1 |
| 2007/0293186 A1 | 12/2007 | Lehmann | |
| 2008/0048851 A1 | 2/2008 | Reyes et al. | |
| 2008/0258910 A1 * | 10/2008 | Stapleford | 340/540 |
| 2009/0124232 A1 * | 5/2009 | D'Arcy et al. | 455/404.2 |

* cited by examiner

*Primary Examiner* — George A Bugg
*Assistant Examiner* — Anne V Lai
(74) *Attorney, Agent, or Firm* — Coats & Bennett, P.L.L.C.

(57) ABSTRACT

A private network emergency pager alert system as described herein can generally utilize a plurality of personal alert pager devices and a main controller in two-way communication with each personal alert pager device. Each personal alert pager device can be provided with a transceiver for receiving alerts from the main controller and for sending alerts to the main controller, a text display for receiving alert messages, switches for sending an alert to the main controller, and a GPS receiver for providing location data of the personal alert pager device to the main controller. The personal alert pager device could additionally be provided with an RFID module and/or a key pad for sending text messages.

16 Claims, 7 Drawing Sheets

Overall System Diagram

PRIVATE NETWORK EMERGENCY ALERT PAGER SYSTEM

BACKGROUND

The private network emergency alert pager system relates generally to an emergency alert system, and more particularly to a private network emergency alert system utilizing multiple personal alert pager devices and a monitoring station which is in two-way communication with each personal alert pager device.

"Active Shooter" events have increased dramatically in the last decade; a common problem has been the lack of technology that provides instantaneous, mass notification to potential victims in the immediate threat area. The incident at Virginia Tech increased the focus on the problem when the area in need of protection encompasses a wide area such as a sprawling campus with over 100 buildings, and when the threat is mobile. Even victims who were aware of a threat in the area were unaware of which areas contained the threat, and what area to move to for safety. The Active Shooter phenomenon has also resulted in the increased use of RFID-activated and secured doors on campuses nationwide, which are intended to provide secured areas for students and faculty/staff in emergency situations.

Accordingly, there is a need for a system which can provide a solution to the problem of mass notification, and at the same time provide personal accountability for every person in need of notification, protection, and rescue.

SUMMARY

An emergency alert pager system as described herein has the advantages of two-way communication between a Personal Alert Sentry (PAS) and a base station; individual panic alert capability; and being a stand-alone, self-contained system providing instantaneous, truly mass notification.

An emergency alert pager system as described herein can generally comprise at least one personal alert pager device, but preferably a plurality of personal alert pager devices, referred to hereinafter alternatively as either a "pod" or a "Personal Alert Sentry" (PAS), and a single main security controller, referred to herein alternatively as main controller, base station, or monitoring station. Each pod is a portable device that can be handheld or worn by a user. When a pod is activated, it sends its location to software of the main controller. The main controller shows the pod on a screen along with pertinent information. The controller can send back a message to the individual pod or a general announcement to all pods. If any pod is unaccounted for, the pod can be polled by the main controller as to its location and status. Pods can be deployed in a wide screen search, and repeaters can be used to increase the range of the system.

An embodiment of the overall private network emergency alert pager system can generally comprise:
1. a main controller;
   which can comprise a computer, one or more associated monitors for displaying data, a base antenna, and optional repeaters for better range or to deal with obstructions.
2. at least one pod, preferably a plurality;
   each in 2-way communication with the base station, and each pod comprising (as described in more detail below in connection with FIG. 4) one or more of a transceiver and associated antenna, a GPS module and associated antenna, a text display screen, and alert buttons/switches.

Each individual pod can generally comprise:
1. spread spectrum transceiver
   For example a 250 mW transceiver in the 900 MHz band.
2. GPS receiver and active antenna
   To receive and decode the GPS positional signal.
3. movement sensor
   To sense movement for higher resolution GPS fixes and power saving.
4. vibrating motor and piezo sounder
   For audible and tactile feedback during alert.
5. LED display
   For text readout of alert information.
6. battery control and charge circuitry
7. emergency alert switches
   For activating an alert to the main controller.
8. microcontroller
9. optional keypad
   Could permit text messages to be sent from the pod to the main controller to provide details about the threat.
10. optional RFID module
    Could be utilized to gain access to safe/secure areas, buildings, etc.

As indicated above, each pod can utilize pager technology with one or more of text messaging on LCD display screens, audible alert tones, vibrating alerts, GPS technology, RFID (radio frequency identification) technology, and two way communication between the pager device and the monitoring station.

The emergency alert pager system described herein can provide a solution to the problem of mass notification, and at the same time provide personal accountability for every person in need of notification, protection, and rescue.

To the accomplishment of the foregoing and related ends, certain illustrative aspects of the emergency alert pager system are described in the following description and drawing figures. These aspects may be indicative of but a few of the various ways in which the principles of the emergency alert pager system may be employed, and which is intended to include all such aspects and any equivalents thereof. Other advantages and features of the emergency alert pager system may become apparent from the following detailed description when considered in conjunction with the drawing figures.

BRIEF DESCRIPTION OF THE DRAWING FIGURES

A more complete understanding of the emergency alert pager system described herein can be obtained by considering the following description in conjunction with the accompanying drawing figures in which.

DESCRIPTION OF CERTAIN EMBODIMENTS

Figure 1:
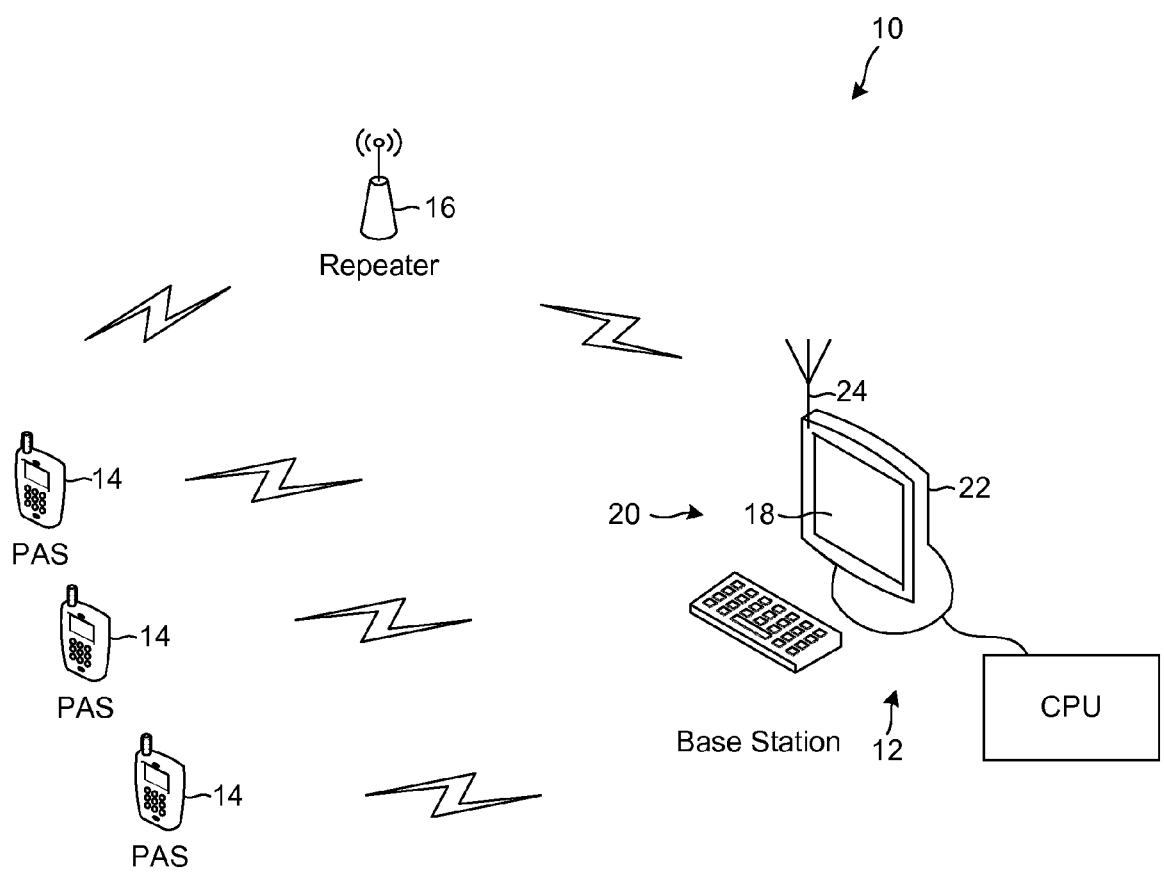
FIG. 1 illustrates an embodiment of an emergency alert pager system as described herein.

The emergency alert pager system is particularly suited to college and public school campuses, groups of law enforcement resources at national events, business campus environments, and the like. The emergency alert pager system is designed to address critical incidents where mass notification of threat information has to be disseminated at extreme speed. The emergency alert pager system allows for two-way communication between individuals and a dispatch center. That is, an individual can send an alert or alert message to the dispatch center and the dispatch center can send an alert or alert message to an individual, a group of individuals, or all individuals on the system. The emergency alert pager system is preferably a stand alone system utilizing its own networks and communications equipment and protocols. Thus, there is no reliance on third party equipment and networks, allowing for faster and more reliable delivery of alerts and/or alert messages.

Using the Virginia Tech incident as an example to conceptualize the emergency alert pager system, the college used email as an alert system, but it was too slow and ineffective in notifying the student body and faculty because not everyone is looking at email at the same time. Text messaging with phones also was flawed due to numerous issues, including the fact that it took approximately 30 plus minutes to notify the 18,000 subscribers. The seriousness of the problem is more clearly seen when you realize there are over 30,000 students and faculty at Virginia Tech. Additional evidence that the cell phone/email systems are not the answer to the problem is seen in the number of universities going back in time 60 years with the adoption of tornado sirens as a band-aid solution to instantaneous, mass notification of a threat. However, an obvious deficiency is that a siren only indicates that there is "a problem." It does not tell you what the problem is, where the problem is, or where to go for safety. The emergency alert pager system does all of that, and more.

The emergency alert pager system is particularly well suited for protecting groups of people within a specified area, but is simultaneously effective for use as an alert system capable of providing individual security. In the case of Virginia Tech, for example, instead of 30 or more minutes passing by before approximately ⅔ of the university population was warned of a double homicide, the emergency alert pager system could notify all 30,000 people in less than one second of sending the message. The campus shooting rampage actually took place about two hours after the initial double homicide, but students and faculty/staff were not notified of the threat in time to avoid the ensuing tragedy.

According to the emergency alert pager system described herein, instead of a dispatch center getting numerous phone calls that are slow and cumbersome and have to be repeated, a dispatch center equipped with the emergency alert pager system main controller/monitoring station could receive instantaneous alerts from each person equipped with a personal alert pager device in the threat area. Upon becoming aware of any threat, including upon receipt of the first alert from a personal alert pager device, the dispatch office can use the main controller to send an alert to every other person having a personal alert pager device, alerting everyone on campus in less than one second.

Each alert received by the main controller can be displayed on a monitor, preferably with each personal alert device represented by points of light on a graphical map screen representing the whole campus. As the points of light appear, as alerts are being received instantaneously, the dispatch center can alert first responders to the exact location of numerous threat origination points—the exact location being indicated by the GPS position of the personal alert pager device sending the alert. Additionally, the monitor can also "poll" each personal alert device if desired, to determine the exact location of each personal alert pager device, even such devices which have not sent an alert to the main controller.

The main controller can also send a warning alert of the threat area to every person on campus in under one second, if they have the personal alert pager device. The points of light graphically representing every alert sent from a personal alert paging device also can trace a "path" that the threat is taking, thereby speeding up the response of law enforcement. The exact location of each point of light will be displayed as the GPS coordinates of each personal alert pager device that transmits an alert to the main controller.

Additionally, RFID technology can be added to multitask with the personal alert pager device, allowing the device to be used for gaining access to buildings, secure areas, and the like which can be designated as safe areas for people to seek refuge from the threat.

As noted above, each personal alert pager device cannot only receive an alert, it can send an alert to the monitoring station. Consequently, the personal alert pager device can also serve as an individual panic alarm in the case of an attack, assault, abduction, and the like. The two-way alert capability, i.e., two-way communication between the personal alert pager device and the monitoring station, is believed to be unique to the emergency alert pager system.

Figure 2:
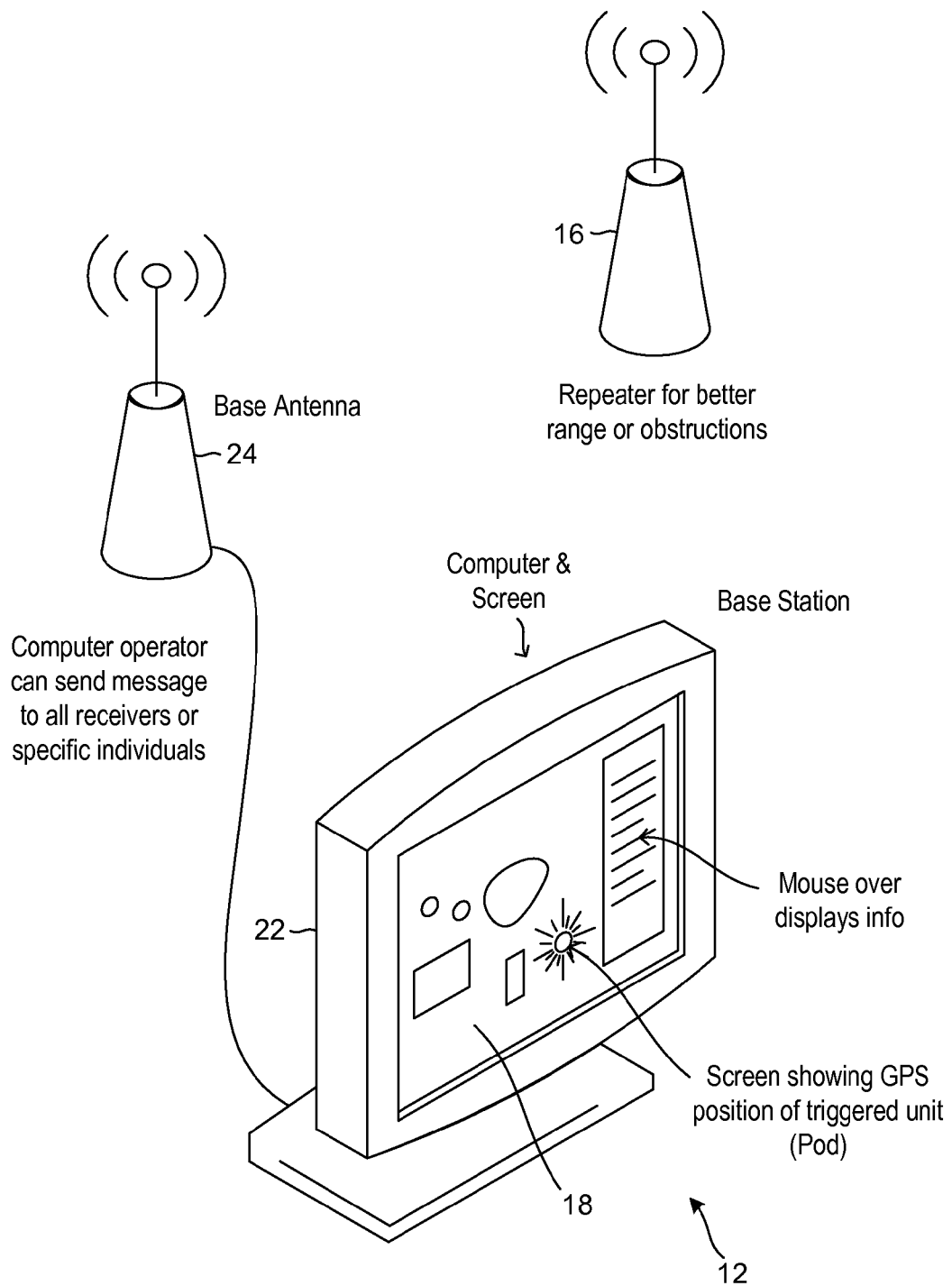
FIG. 2 illustrates an embodiment of an emergency alert pager base station as described herein.
Figure 3:
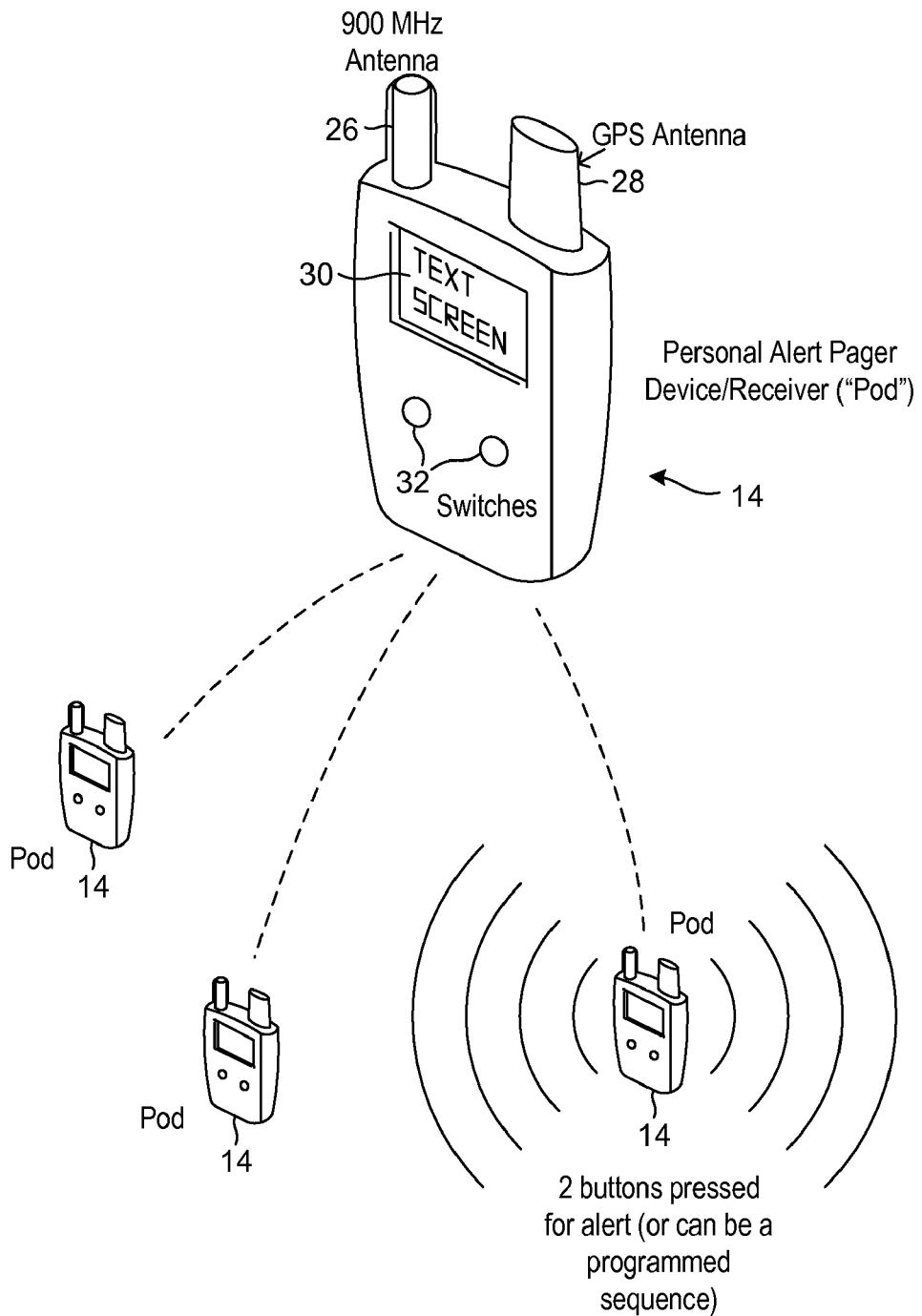
FIG. 3 illustrates an embodiment of an emergency alert pager device as described herein.

Referring now to the drawing figures, an embodiment of the private network emergency alert pager system 10 is illustrated in FIG. 1. As further shown in FIGS. 2 and 3, the system 10 generally comprises:

a main controller 12;
  which can comprise a computer 20, one or more associated monitors 22 for displaying data, a base antenna 24, an optional repeater 16 for better range or to deal with obstructions.
a plurality of pods 14;
  each in 2-way communication with the base station 12, and each pod 14 comprising (as described in more detail below in connection with FIG. 4) one or more of a transceiver 26 and associated antenna, a GPS module 28 and associated antenna, text display screen 30, and alert buttons/switches 32.
a repeater 16.

The system 10 is comprised of at least one portable unit 14, but preferably many portable units 14, or pods, and a single main security controller 12 (which may alternatively be referred to as a main controller, master controller, monitoring station, or base station). Each pod 14 can be handheld or wearable by a user. When a pod 14 is activated, it sends its location to software of the main controller 12. The main controller 12 shows the pod 14 on a screen 18 along with pertinent information. The main controller 12 can send back a message to the individual pod 14 or a general announcement to all pods 14. If a pod 14 user is missing, their pod 14 can be polled as to its whereabouts and status. Pods 14 can be deployed in a wide screen search, and repeaters 16 can increase the range of the system.

The emergency alert pager system 10 described herein can generally be comprised of the main controller 12 that monitors and processes emergency calls from multiple sources, primarily large numbers of portable units (which may alternatively be referred to as a personal alert pager device 14, or a pod 14). The system 10 preferably utilizes a private area wireless network, mainly for reasons of speed and robustness, and avoids all the disadvantages of public service networks. As a stand-alone system, there are no associated cellular phone costs or rental agreements to deal with. For example, the pods 14 can number up to 250 thousand. Each pod 14 can be roughly the size of a small cell phone, and can include, inter alia, a complete spread spectrum digital transceiver system, a high sensitivity GPS receiver, and a visual and audible alert complete with vibrating silent alert. The visual alert can comprise, for example, a two line alpha numeric display (which can be an LCD display) which can deliver detailed threat information and emergency instructions to all units in under 30 seconds.

The emergency alert pager system 10 can use pager technology with one or more of a variety of alert notification systems, such as text messaging on LCD display screens, audible alert tones, vibrating alerts, and GPS technology as well as RFID (radio frequency identification) technology. When the system 10 operates on a private network, it is a closed, i.e., private, system. It does not rely on a third party to wait for a dial tone, an operator in emergency operations, or the relatively clumsy transfer of oral or typed information. Nor does law enforcement need to perform a GPS type triangulation.

The pod 14 is unique in that it can not only receive an alert (by text, vibration alert, or audible alert) from the base or monitoring station 12, but can also send an alert to the monitoring station 12, via a spread spectrum transceiver 26, for example, by activation of one or more switches 32, buttons 32, or the like. An alert may be a message, for example, "emergency", "need assistance", or the like.

Each pager-like pod 14 can also be tracked by GPS, and can thus be located by the monitoring station 12 after an alert is sent to the base station 12. The GPS information from the last valid fix is transferred to the controller in under one second, along with the ID number of that pod 14. In a fight or flight situation, the average, untrained person could forget their own name, much less their relative position in relation to the event. Thus, the GPS position is vital information that is gathered from each pod 14.

In addition to receiving alerts from individual pods 14, the main controller 12 can simultaneously send instructions to select individual pods 14, or a general broadcast to all pods 14, or all pods 14 in a certain area. If desired, pods 14 can be prioritized by groups or individuals (teachers, security staff, administration, and others). Each pod 14 can have a unique identification code. The system 10 can also be used for general announcements to the student body/faculty or page a specific individual in the network in under one second from the message being typed.

Each pod 14 can also be provided with RFID keycard type system capability for ingress to buildings, as well as restricted or secure areas. The RFID capability, which functions similar to bar coding, can enable the pod 14 to "scan" across a receiver such as a card reader to electronically unlock secure doors.

The software interface can comprise, inter alia, a database containing identification (ID) information for each device within the specified area being served by the system 10, and can include graphic mapping for a specified area that all the pods 14 operate within. This can be displayed as a map on a computer monitor 22 associated with the main controller 12, wherein each pod 14 can be displayed as a "points of light" on the map. Depending on application, each pod 14 can appear as a point of light when an alert is sent to the monitoring station 12, when the pod 14 is alerted by the monitoring station 12, and/or when the pod 14 is queried by the monitoring station 12. The main controller 12 software can be designed to provide a dropdown window containing information including current GPS coordinates for each pod 14. Multiple display screens 18 can be provided associated with the main controller 12, and the pod 14 locations can be displayed simultaneously on one screen 18, while the main database can be displayed on a different screen, or screens.

The pod 14 can be configured to transmit its GPS location to the main controller 12 both when the pod 14 sends an alert to, and when it receives an alert from, the main controller 12. Additionally, the main controller 12 can "poll" or "ping" the pod 14 to determine its GPS location. Thus, if a user/pod 14 is unaccounted for, the pod 14 can be pinged to activate the pod 14 to transmit its GPS coordinates to the main controller 12. Each pod 14 can also store a history of its GPS coordinates, in case there is a need for that information. Line of sight range is in excess of three (3) miles, and repeaters 16 can be used for extended range or blind spots behind obstructions. The pods 14 are rechargeable, and will last up to three (3) days on a single charge.

Figure 4:
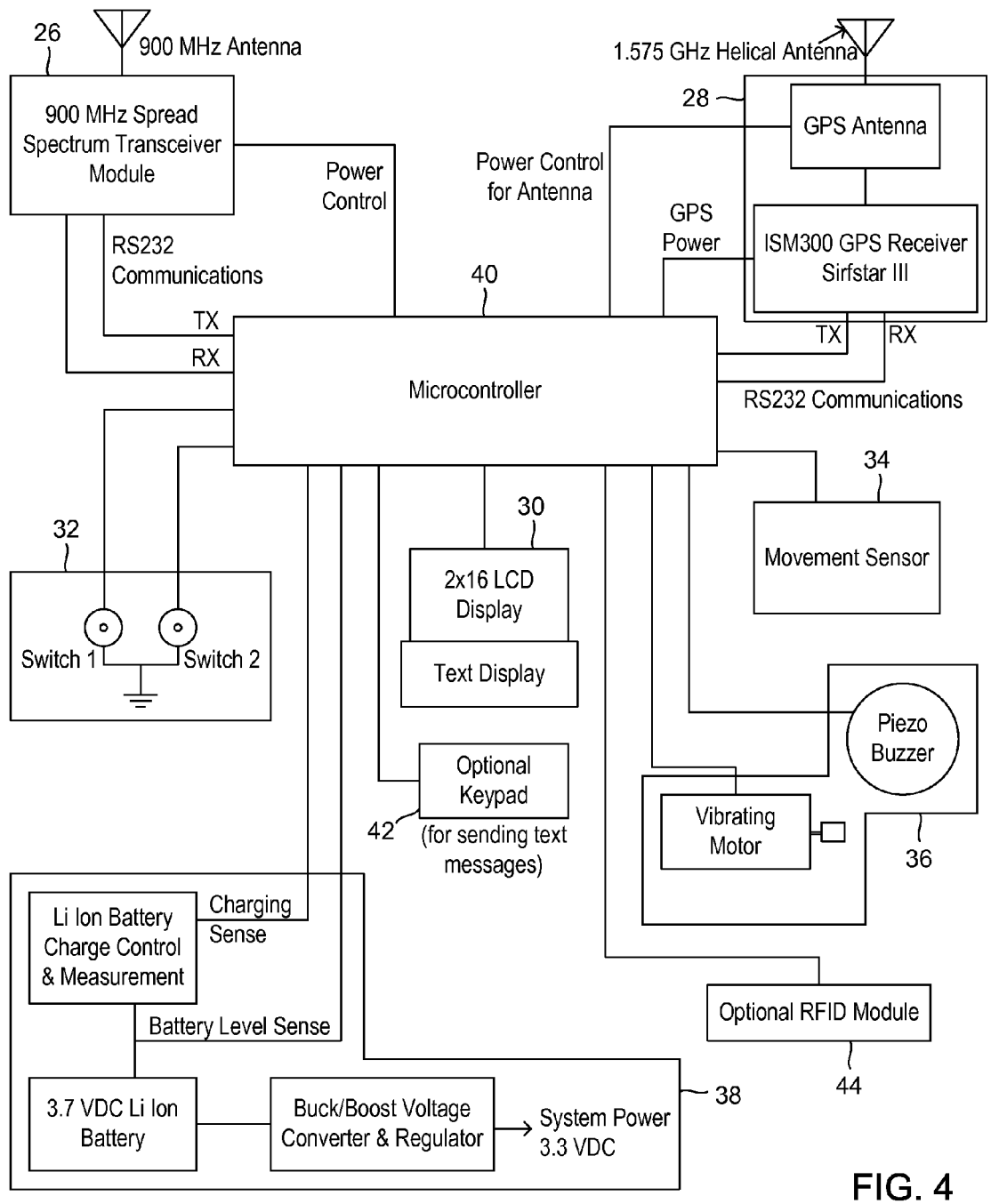
FIG. 4 illustrates another embodiment of an emergency alert pager device as described herein.

In FIG. 4, the pod 14 is broadly illustrated and can generally comprise:
- a spread spectrum transceiver 26
  - For example a 250 mW transceiver in the 900 MHz band.
- a GPS receiver 28 and active antenna
  - To receive and decode the GPS positional signal.
- a movement sensor 34
  - To sense movement for higher resolution GPS fixes and power saving.
- a vibrating motor and piezo sounder 36
  - For audible and tactile feedback during alert.
- an LED display 30
  - For text readout of alert information.
- battery control and charge circuitry 38
- emergency alert switches 32
  - For activating an alert to the main controller 12.
- a microcontroller 40
- an optional keypad 42
  - Could permit text messages to be sent from the pod 14 to the main controller 12 to provide details about the threat.
- an optional RFID module 44
  - Could be utilized to gain access to safe/secure areas, buildings, etc.

The pod 14 can be configured to send an alert to the base station 12, for example, by pushing two buttons 32 (switches 32) at the same time. Alternatively, a specific button 32 sequence can also be programmable to the system or user's preference. The buttons 32 can be recessed into the case to prevent accidental alerts.

The pod 14 transfers information to the master controller 12, for example, using a state of the art, embedded spread spectrum transceiver 26. The transceiver 26 preferably transmits in the 900 MHz region at a power level of approximately 250 mW. This level of power ensures a line of sight range in excess of two (2) miles. The use of spread spectrum technology rapidly changes the transmit frequency many times a second. If there is an in band signal, either noise or active jamming, this makes the transmission much less likely to be interfered with. If a transmission is received intact, an acknowledgement is sent by the master controller 12. If, for some reason, the transmission is not properly received, it will be resent, for example, up to 26 times, to complete transmission.

A text type keypad 42 can be installed on the pod 14, which provides the capability to send more detailed information to the base station 12. However, in emergency situations, there typically is no time to send a text message and keeping operation as simple as possible, i.e., just pushing the buttons 32, can be desirable.

The latest generation of GPS chipsets uses an extremely high sensitivity and high speed correlator to decode the available GPS signals. Combined with a very reliable helically wound antenna, the system can lock onto very weak signals. The need to be outdoors, in a large field with no obstructions of the sky, is a thing of the past. Indoor fixes of position are much more reliable. The GPS unit can simultaneously track up to 20 satellites for very accurate positional information.

If the pod 14 loses "sight" of enough satellites for a fix, it will transmit the last good fix received, along with the time of the fix. This gives the main controller 12 (and the first responders) more information than just the pod 14 ID number—it provides a place to begin the search.

Under a worst case scenario, where a pod 14 cannot get a position fix, and the last fix is very old, the pod 14 can be tracked using RF tracking techniques to recover the pod 14. All pod 14 IDs are encoded, so the possibility of an unauthorized user tracking a pod 14 is very unlikely.

The following list of features is provided by way of example only, merely to highlight some features of the private network emergency alert pager system 10. This list is not an all inclusive list of every possible feature, and more features will be apparent to one of ordinary skill in the art upon reading of this disclosure.

A. This is a two-way alert system; main controller 12 to individual pods 14 and individual pods 14 to main controller 12.
B. Alerts can be sent to one or all pods 14 simultaneously, with audible, silent, tactile and/or text messaging format.
C. Alerts are extremely high speed, unlike typical text messaging systems relying on email or cell-phone devices.
D. Each pod 14 is traceable by internal GPS modules 28 in every pod 14.
E. The physical location of each pod 14 can be displayed as a point of light on a computer monitor 22 to immediately reveal the exact GPS coordinate of each pod 14 sending or receiving an alert.
F. The points of light appearing on the main controller 12 monitor 22 serve as real-time threat locators enabling real-time threat tracking, by means of each additional alert being sent to the main controller 12 as the threat moves within the service area, such as a college campus, other compounds, or other types of areas.
G. The pods 14 can be RFID-scanning capable for gaining entrance to safe or other secured areas.
H. The pods 14 can be identified with individual data saved in a separate data-base that works in conjunction with the main controller 12; a "mouse-over" feature can be programmed to allow the controller to identify the registered user of the alerting pod 14 as it appears as a point of light on the monitor 22.

Figure 5:
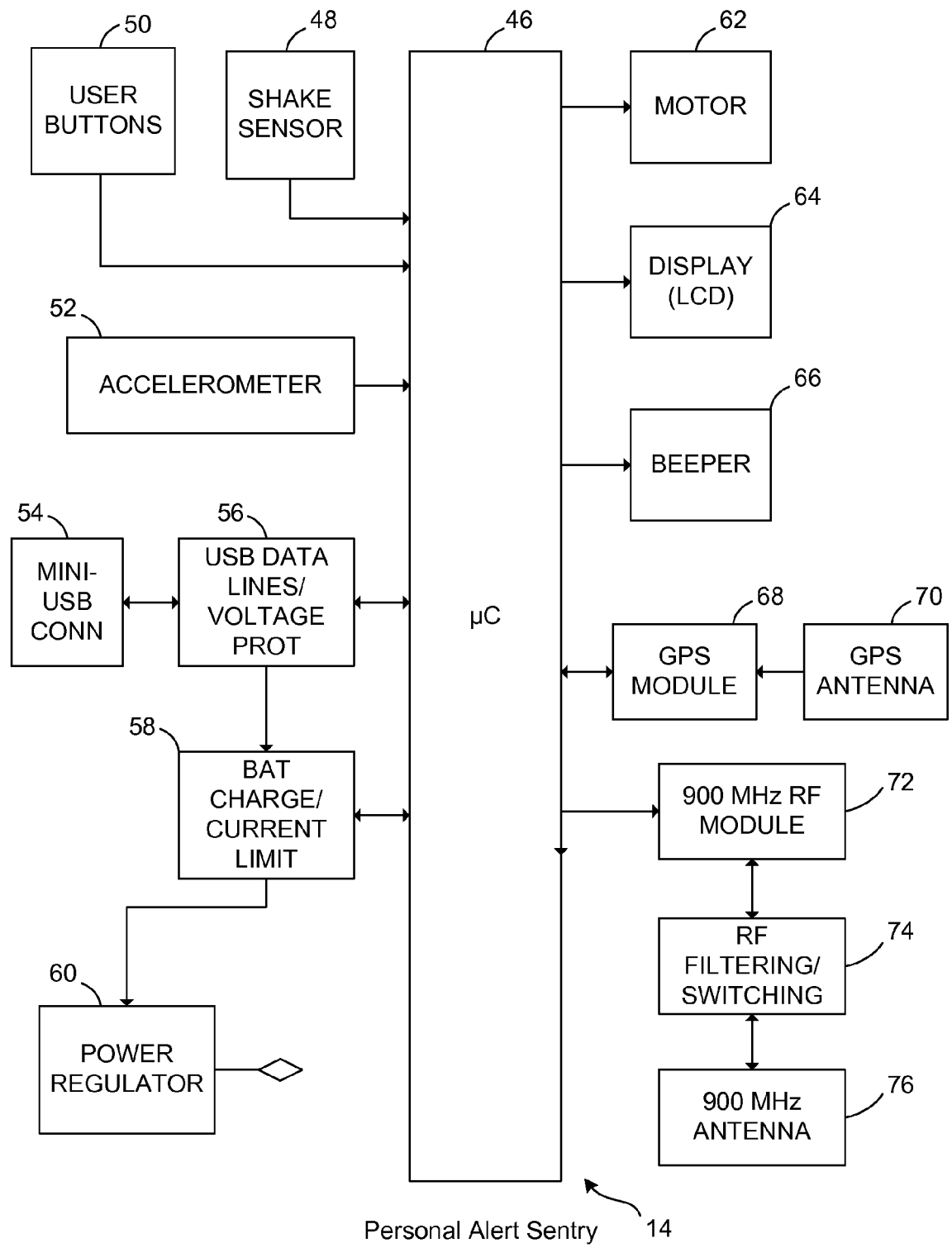
FIG. 5 illustrates another embodiment of an emergency alert pager device as described herein.

Referring to FIG. 5, an embodiment of a pod 14 is illustrated. The pod 14 includes:

μC-Microcontroller 46—The firmware resides on this device, which provides an interface to the all of the components in the circuit and controls the user interface menus.
Shake sensor 48—Chatters if the unit is moved in order to facilitate power savings and GPS tracking.
User Buttons 50—allows the user to interact with the unit in order to scroll through menus and to signal an emergency situation.
Accelerometer 52—allows the unit to perform dead reckoning, which allows the system GPS to track even when in places where the GPS signal is too low to function normally as well as facilitating power savings. This would replace the shake sensor 48 if used.
Mini-USB Connection 54—provides USB data interface as well as charging voltage.
USB data lines/voltage protection 56—this entails the use of two separate chips that protect the microcontroller 46 and other integrated circuits from voltage spikes both on the USB data lines and input voltage (+5VDC).
Battery charge/current limit 58—two integrated circuits work together to accomplish several functions, which are: safely charging the 4.2V lithium-ion battery, limiting the total amount of current drawn from a connected USB port to 500 mA or 100 mA depending on the port limitations, managing that total current by distributing it to the unit and the battery charge current, which effectively allows the unit to run while charging the battery, provides feedback to the Microcontroller 46 about battery charge status, battery fault conditions, input power status, allows the Microcontroller 46 to change the current limitation mode and shut down the battery charge function.
Power regulator 60—provides a regulated 3.0Vdc for the components in the circuit using the battery/charger voltage as an input.
Motor 62—serves to vibrate the unit in order to call the attention of the user.
Display (LCD) 64—serves as the main interface to the user, which allows the user to see pertinent information on the display 64 as well as scroll through the user menus.
Beeper 66—4 kHz Piezo buzzer serves to call attention to the unit by providing a "beep" of an arbitrarily significant volume.
GPS module 68—provides the current GPS coordinates to the Microcontroller 46.
GPS antenna 70—allows the GPS module 68 to receive GPS data from the satellites.
900 MHz RF Module 72—transmits and receives 900 MHz frequency-hopping-spread-spectrum data, which allows the units to interface to the main hub wirelessly.
RF Filtering/switching 74—facilitates reliable and efficient transmitting and receiving of the 900 MHz wireless data.
900 MHz antenna 76—radiates and receives the 900 MHz wireless data transmissions.

Figure 6:
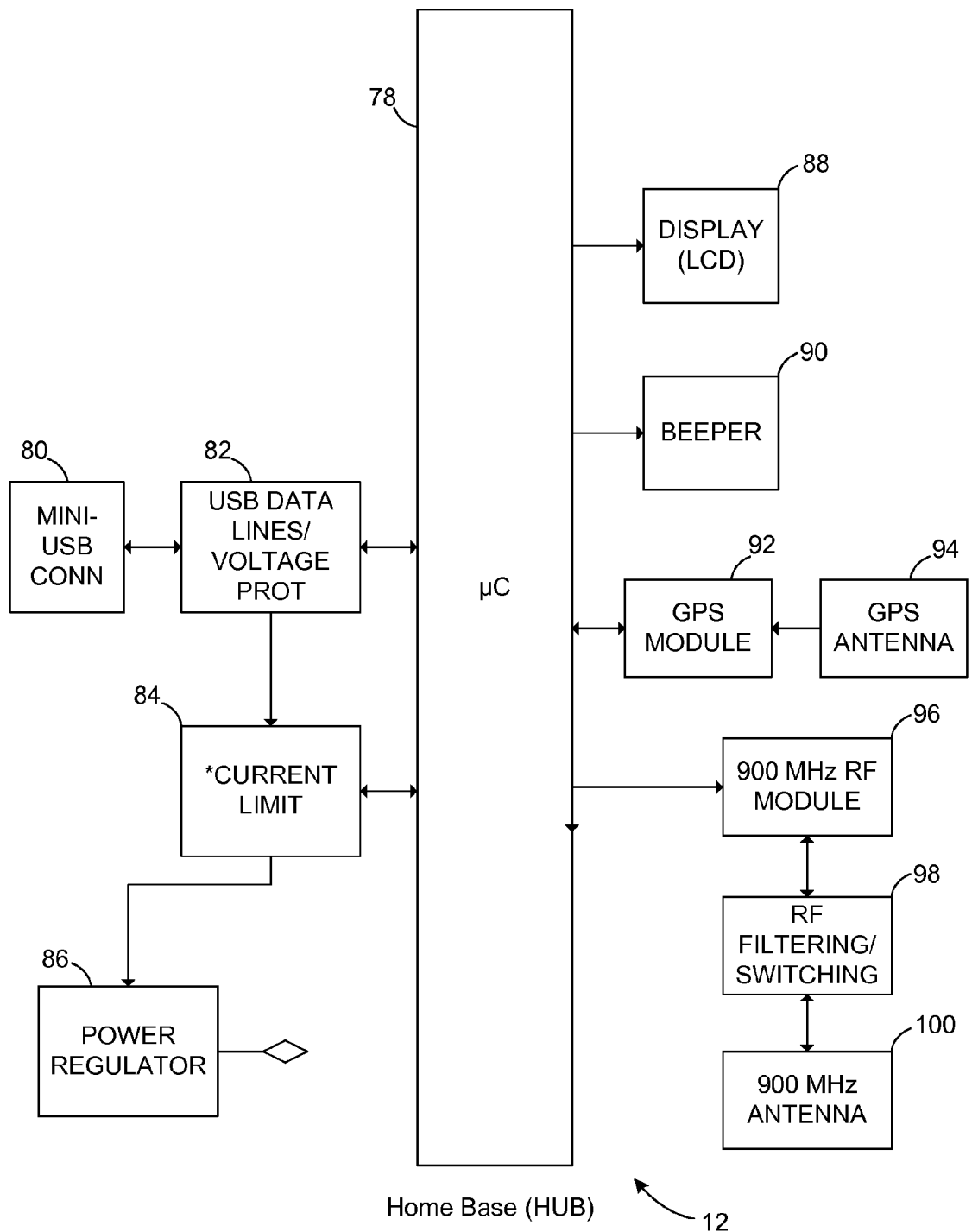
FIG. 6 illustrates another embodiment of an emergency alert pager base station as described herein.

Referring to FIG. 6, an embodiment of a base station 12 is illustrated. The base station 12 includes:

μC-Microcontroller 78—The firmware resides on this device, which provides an interface to the all of the components in the circuit and controls the user interface menus.
Mini-USB Connection 80—provides USB data interface as well as charging voltage.
USB data lines/voltage protection 82—this entails the use of two separate chips that protect the microcontroller 78 and other integrated circuits from voltage spikes both on the USB data lines and input voltage (+5VDC).
Current limit 84—only one integrated circuit will assure that the circuit cannot draw more than the maximum allowed by the USB port specification, which is 500 mA for most although some can be 100 mA depending on the port type.
Power regulator 86—provides a regulated 3.0Vdc for the components in the circuit using the battery/charger voltage as an input.

Display (LCD) 88—serves as the main interface to the user, which allows the user to see pertinent information on the display 88 as well as scroll through the user menus.

Beeper 90—4 kHz Piezo buzzer serves to call attention to the unit by providing a "beep" of an arbitrarily significant volume.

GPS module 92—provides the current GPS coordinates to the Microcontroller 78.

GPS antenna 94—allows the GPS module 92 to receive GPS data from the satellites.

900 MHz RF Module 96—transmits and receives 900 MHz frequency-hopping-spread-spectrum data, which allows the units to interface to the main hub wirelessly.

RF Filtering/switching 98—facilitates reliable and efficient transmitting and receiving of the 900 MHz wireless data.

900 MHz antenna 100—radiates and receives the 900 MHz wireless data transmissions.

Figure 7:
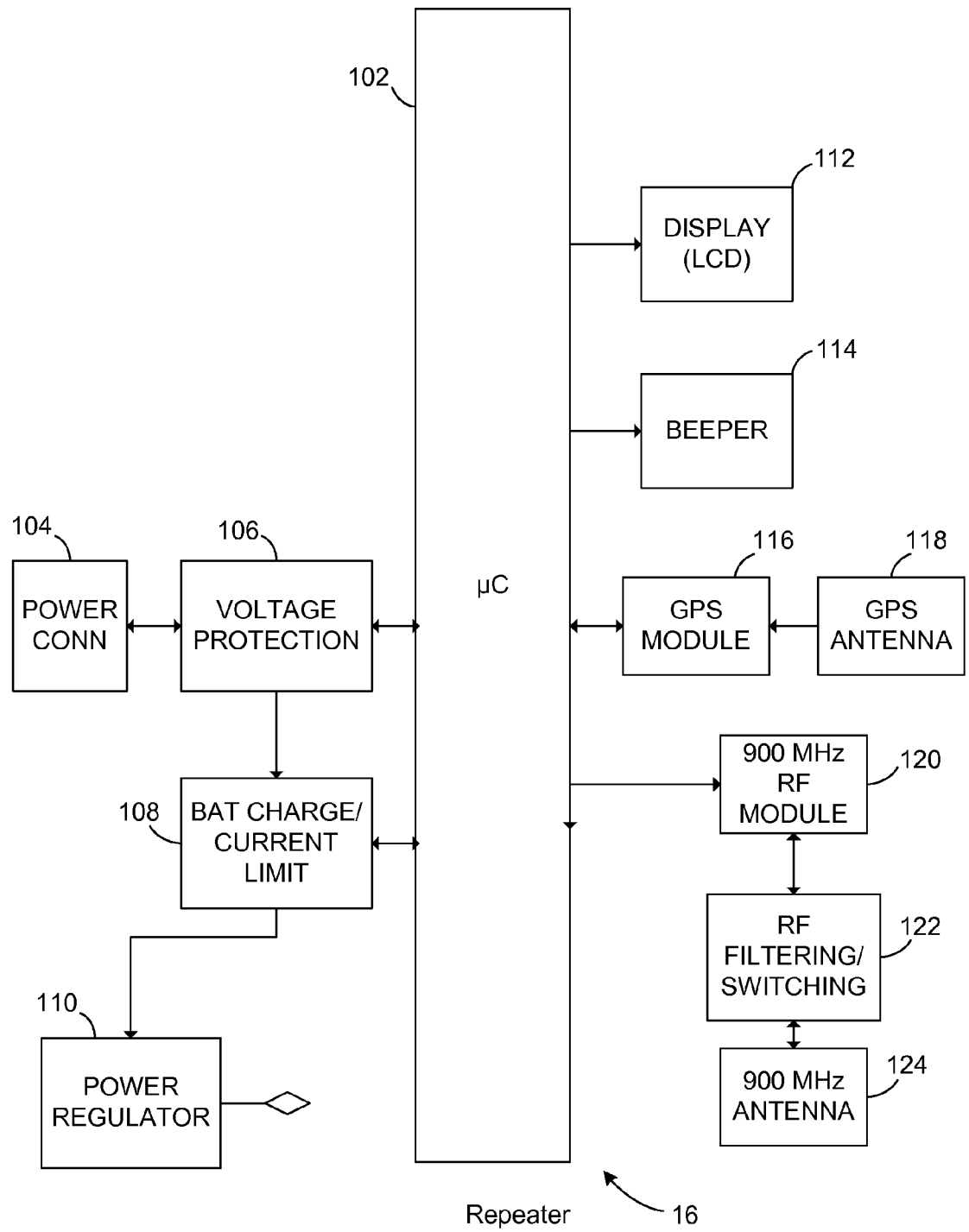
FIG. 7 illustrates an embodiment of an emergency alert pager repeater as described herein.

Referring to FIG. 7, an embodiment of a repeater 16 is illustrated. The repeater 16 includes:

μC-Microcontroller 102—The firmware resides on this device, which provides an interface to the all of the components in the circuit and controls the user interface menus.

Power connection 104—allows an external 5Vdc power source to be connected directly.

Voltage protection 106—one chip protects the circuitry from spikes on the input voltage.

Bat charge/current limit 108—two integrated circuits work together to accomplish several functions, which are: safely charging the 4.2V lithium-ion battery, limiting the total amount of current drawn from a connected USB port to 500 mA or 100 mA depending on the port limitations, managing that total current by distributing it to the unit and the battery charge current, which effectively allows the unit to run while charging the battery, provides feedback to the Microcontroller 102 about battery charge status, battery fault conditions, input power status, allows the Microcontroller 102 to change the current limitation mode and shut down the battery charge function.

Power regulator 110—provides a regulated 3.0Vdc for the components in the circuit using the battery/charger voltage as an input.

Display (LCD) 112—serves as the main interface to the user, which allows the user to see pertinent information on the display 112 as well as scroll through the user menus.

Beeper 114—4 kHz Piezo buzzer serves to call attention to the unit by providing a "beep" of an arbitrarily significant volume.

GPS module 116—provides the current GPS coordinates to the Microcontroller 102.

GPS antenna 118—allows the GPS module 116 to receive GPS data from the satellites.

900 MHz RF Module 120—transmits and receives 900 MHz frequency-hopping-spread-spectrum data, which allows the units to interface to the main hub wirelessly.

RF Filtering/switching 122—facilitates reliable and efficient transmitting and receiving of the 900 MHz wireless data.

900 MHz antenna 124—radiates and receives the 900 MHz wireless data transmissions.

What has been described above includes exemplary embodiments of a private network emergency alert pager system. It is, of course, not possible to describe every conceivable combination of components or methodologies for purposes of this description, but one of ordinary skill in the art may recognize that further combinations and permutations are possible in light of the overall teaching of this disclosure. Accordingly, the description provided herein is intended to be illustrative only, and should be considered to embrace any and all alterations, modifications, and/or variations that fall within the spirit and scope of this description, and any appended claims.

What is claimed is:

1. An emergency pager alert system configured as a private, stand-alone system for high-speed mass notifications of threat information to a defined population of persons within a defined geographic area, said emergency pager alert system comprising:

a monitoring station and an associated plurality of pager devices;

a closed private radio network for communicatively coupling each pager device in two-way communication with the monitoring station, said closed private radio network covering the defined geographic area and used for transmitting alert messages from individual ones of the pager devices to the monitoring station, and for broadcasting alert messages from the monitoring station, for substantially simultaneous reception by all pager devices operating within the defined geographic area;

each pager device assignable to a given person in the defined population and dedicated for use in the emergency pager alert system, and comprising:

a GPS module for determining the location of the pager device;

a transceiver for transmitting alert messages to the monitoring station and receiving alert messages broadcast by the monitoring station; and a processor to process identification data in each received alert message that indicates whether or not the received alert message targets the pager device, and to output one or more alert signals to the given person responsive to the received alert message only if said identification data indicates that the received alert message targets the pager device; and wherein said monitoring station includes a computer that is configured to:

maintain location information for all pager devices, based on receiving location data from each pager device;

receive an alert message from a given one of the pager devices and determine a location of said given pager device, based on said location information;

identify pager devices at or nearby the location of the given pager device, based on said location information;

generate one or more alert messages for said identified pager devices, based on setting the identification data in said one or more generated alert messages to target said identified pager devices; and broadcasting said one or more generated alert messages from said closed private radio network.

2. The emergency pager alert system of claim 1, wherein the closed private radio network comprises a frequency-hopping spread spectrum radio network, and wherein each pager device includes a radio transceiver configured for frequency-hopping spread spectrum communications, for transmitting alert messages to the monitoring station and receiving alert messages from the monitoring station, and wherein said monitoring station includes or is associated with a base station transceiver, for broadcasting alert messages to the pager devices and for receiving alert messages from the pager devices.

3. The emergency pager alert system of claim 1, wherein the closed private radio network is configured to use a closed communication protocol that is independent of cellular and other public or commercial networks.

4. The emergency pager alert system of claim 1, wherein the closed private radio network excludes any third-party communication networks or network links, for supporting the two-way communications between the pager devices and the monitoring station.

5. The emergency pager alert system of claim 1, wherein the closed private radio network includes at least one base station transceiver that is integrated in the monitoring station, or is communicatively coupled to the monitoring station, and is configured to broadcast all alert messages generated by the monitoring station over the defined geographic area.

6. The emergency pager alert system of claim 1, wherein the pager devices are configured to report location data to the monitoring station, via transmission over the closed private radio network, and wherein the monitoring station is configured to update the location information it maintains for each pager device based on the location data reported by the pager device to the monitoring station.

7. The emergency pager alert system of claim 1, wherein the monitoring station is configured to broadcast polling messages that target particular ones of the pager devices, to prompt each said targeted pager device to report its location data, and is configured to correspondingly update the location information of each targeted pager device that is successfully polled.

8. The emergency pager alert system of claim 1, wherein the monitoring station is configured to generate display information, for displaying points of light overlaid on a representation of at least part of the defined geographic area, wherein said points of light correspond to pager devices from which alert messages have been recently sent to the monitoring station.

9. The emergency pager alert system of claim 8, wherein the monitoring station is further configured to determine a direction of movement for a current emergency situation, based on the locations, as determined from the location information, of those pager devices that transmit alert messages to the monitoring station for a given emergency situation, and is further configured to include in the display information a path trace or other indication of said direction of movement.

10. The emergency pager alert system of claim 1, wherein each pager device includes a dead reckoning circuit, and wherein the pager device generates its location data based on the GPS module when GPS signals are available, and generates its location data based at least in part on the dead reckoning circuit when GPS signals are not available, wherein the dead reckoning circuit comprises an accelerometer circuit configured for dead reckoning, and wherein the pager device is configured to maintain a GPS-based location fix using the GPS receiver, if GPS signals are available, and, if GPS signals are unavailable, to update or replace the GPS-based location fix using dead reckoning via the accelerometer circuit, and further wherein each pager device is configured to maintain a GPS-based location fix using the GPS module, and is further configured to control when or how often it powers the GPS module for updating and reporting the GPS-based location fix, based on detecting movement of the pager device via a motion detector included in the pager device.

11. The emergency pager alert system of claim 1, wherein the monitoring station is configured to identify pager devices that are unaccounted for in the emergency pager alert system, and, in response thereto, to poll for the status and location of the unaccounted for pager devices, and to update location information maintained by the monitoring station for those unaccounted for pager devices that are successfully polled.

12. The emergency pager alert system of claim 1, wherein the closed private radio network includes one or more repeaters, for extending radio coverage of the closed private radio network into one or more locations or regions within the defined geographic area that are not well covered by a base station transceiver that is integrated in or associated with the monitoring station.

13. The emergency pager alert system of claim 12, wherein each repeater is configured to repeat transmissions directly from the base station transceiver and from given ones of the pager devices.

14. The emergency pager alert system of claim 12, wherein at least one of the repeaters is configured to repeat transmissions from another repeater.

15. The emergency pager alert system of claim 1, wherein each pager device comprises an emergency input button or switch and is configured to transmit an alert message to the monitoring station responsive to user activation of the emergency input button or switch, and wherein the monitoring station is configured to use the location information associated with one or more first pager devices from which alert messages are received, and location information associated with remaining ones of the pager devices in the plurality of pager devices, to identify a group of one or more pager devices to which alert messages should be sent, and to generate one or more corresponding alert messages for broadcasting by the closed private radio network.

16. The emergency pager alert system of claim 1, wherein at least one of the pager devices is configured to provide access control capability for gaining access to defined areas or building, by including an RFID device that is configured to store or communicate identification information for access control.

* * * * *